UNITED STATES PATENT OFFICE.

JOSEPH NERKING, OF DUSSELDORF, GERMANY, ASSIGNOR TO CHEMISCHE FABRIK REISHOLZ, G. M. B. H., OF DUSSELDORF-REISHOLZ, GERMANY.

MANUFACTURE OF HARMLESS COMBINATIONS OF SULFOCYANIC ACID.

1,011,075.  Specification of Letters Patent.  Patented Dec. 5, 1911.

No Drawing. Original application filed May 2, 1911, Serial No. 624,602. Divided and this application filed August 3, 1911. Serial No. 642,201.

*To all whom it may concern:*

Be it known that I, JOSEPH NERKING, a citizen of the Empire of Germany, residing at Dusseldorf, in the Empire of Germany, have invented a new and useful Manufacture of Harmless Combinations of Sulfocyanic Acid, of which the following is a specification.

This application is a division of an application filed by me May 2nd, 1911 under Serial Number 624,602.

Salts of sulfocyanic acid (HCNS), such as sulfocyanate of potassium, sulfocyanate of sodium, sulfocyanate of ammonium, have been employed as prophylactics against the decomposition of teeth and the mycodermitis, also as antispasmodics and sedatives, but they are objectionable on account of their poisonousness, for which reason they are nearly no longer employed.

My invention relates to the manufacture of new combinations of sulfocyanic acid, which are harmless and therefore suitable for medical purposes.

The invention essentially consists in the combination of salts of sulfocyanic acid with albumen of any description, either alone or in conjunction with other substances.

When salts of sulfocyanic acid are mixed with albumen in the dry or moist condition or with solvents, solid gummy bodies or solutions of the same respectively will be formed, which bodies when dry are partly difficultly soluble in water or spirit of wine and partly insoluble. The soluble part of the bodies coagulates on boiling the solution, also on the addition of stronger acids, while the insoluble part simply swells up in water. Both parts contain more or less sulfocyanic acid (HCNS) in proportion to the concentration of the reacting solutions. Such combinations of the sulfocyanic acid may be formed from animal albumens (ovalbumen, casein) as well as from vegetable albumens; however, the casein and the vegetable albumens require to be first dissolved by the addition of an alkali or an alkaline earth, such as for example carbonate of sodium or hydrate of lime.

The mixing of the salts of sulfocyanic acid with albumen ground as finely as possible does not present any difficulties, provided that the quantities are small, the mixture agglomerates and forms a plastic mass, which is dried at a moderate temperature, preferably at 40° centigrade. When the quantities are a little larger, it is advisable to add so much water or rather spirit of wine as to render the mixing easy. For larger quantities it is best to let the two components, viz. the albumen and the salt of sulfocyanic acid, act upon each other in a watery solution, or the salt of sulfocyanic acid may be added undissolved or in an alcoholic solution. The sulfocyanate of albumen may be precipitated from the solution thus obtained with the aid of spirit of wine, whereupon the sediment can be separated by pressing to be dried at a temperature of about 40° centigrade.

It does not matter, whether sulfocyanate of ammonium or sulfocyanate of potassium or sulfocyanate of sodium or sulfocyanate of calcium or sulfocynate of strontium or any other salt of sulfocyanic acid be employed in the process, since in the combination with the albumen only the sulfocyanic acid is a considerable component.

I claim:

1. The method of manufacturing harmless combinations of sulfocyanic acid, which consists in dissolving an albumen in a solvent, adding a salt of sulfocyanic acid, precipitating sulfocyanate of albumen with the aid of spirit of wine, separating the sediment by pressing, and drying the mass.

2. The method of manufacturing harmless combinations of sulfocyanic acid, which consists in dissolving an albumen in a solvent, adding an alcoholic solution of a salt of sulfocyanic acid, precipitating sulfocyanate of albumen with the aid of spirit of wine, separating the sediment by pressing, and drying the mass.

JOSEPH NERKING. [L. S.]

Witnesses:
ALBERT F. NUFER,
LOTTA LARKMANN.